US012481269B2

(12) United States Patent
Satou et al.

(10) Patent No.: US 12,481,269 B2
(45) Date of Patent: Nov. 25, 2025

(54) NUMERICAL CONTROL DEVICE AND COMPUTER-READABLE STORAGE MEDIUM

(71) Applicant: Fanuc Corporation, Yamanashi (JP)

(72) Inventors: Kasumi Satou, Yamanashi (JP); Masashi Yasuda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 129 days.

(21) Appl. No.: 18/289,019

(22) PCT Filed: May 12, 2021

(86) PCT No.: PCT/JP2021/018083
§ 371 (c)(1),
(2) Date: Oct. 31, 2023

(87) PCT Pub. No.: WO2022/239155
PCT Pub. Date: Nov. 17, 2022

(65) Prior Publication Data
US 2024/0219893 A1 Jul. 4, 2024

(51) Int. Cl.
*G05B 19/19* (2006.01)
*G05B 19/402* (2006.01)
*G05B 19/416* (2006.01)

(52) U.S. Cl.
CPC ....... *G05B 19/4166* (2013.01); *G05B 19/402* (2013.01); *G05B 2219/49077* (2013.01)

(58) Field of Classification Search
CPC .. G05B 19/4166; G05B 19/402; G05B 19/19; G05B 2219/49077
(Continued)

(56) References Cited

U.S. PATENT DOCUMENTS

| 10,365,629 | B2* | 7/2019 | Sekimoto | ........... G05B 19/4163 |
| 2001/0012972 | A1* | 8/2001 | Matsumoto | ........ G05B 19/4166 |
| | | | | 700/173 |

(Continued)

FOREIGN PATENT DOCUMENTS

| JP | 2001309678 A | 11/2001 |
| JP | 5240412 B1 | 7/2013 |

(Continued)

OTHER PUBLICATIONS

International Search Report and Written Opinion for International Application No. PCT/JP2021/018083, dated Jul. 20, 2021, 6 pages.

*Primary Examiner* — Gabriel Agared
(74) *Attorney, Agent, or Firm* — Buchanan Ingersoll & Rooney PC

(57) ABSTRACT

This numeral control device includes a control information storage unit that stores a plurality of control information items for controlling a control shaft of a machine tool; a control information determination unit that, on the basis of a speed command for designating a feed speed of the control shaft or a movement command derived from the speed command, determines one control information item among the plurality of control information items stored in a control information storage unit; and a control unit that controls the control shaft on the basis of the one control information item determined by the control information determination unit.

8 Claims, 6 Drawing Sheets

(58) Field of Classification Search
USPC .......................................................... 318/571
See application file for complete search history.

(56) References Cited

U.S. PATENT DOCUMENTS

| | | |
|---|---|---|
| 2013/0204427 A1 | 8/2013 | Terada et al. |
| 2017/0045872 A1* | 2/2017 | Takeuchi ................ G05B 19/19 |
| 2018/0275626 A1* | 9/2018 | Aizawa ............... G05B 19/4163 |
| 2020/0117164 A1* | 4/2020 | Susumu ............... G05B 19/404 |
| 2021/0072710 A1 | 3/2021 | Liang et al. |
| 2021/0247734 A1 | 8/2021 | Sagasaki et al. |
| 2021/0382455 A1 | 12/2021 | Sagasaki et al. |

FOREIGN PATENT DOCUMENTS

| | | |
|---|---|---|
| JP | 2019037081 A | 3/2019 |
| JP | 6740483 B1 | 8/2020 |
| JP | 2021039648 A | 3/2021 |
| WO | 2020085437 A1 | 4/2020 |

* cited by examiner

FIG.3

| | POSITION GAIN | FEEDFORWARD COEFFICIENT | ACCELERATION/ DECELERATION TIME CONSTANT | OSCILLATION CUTTING |
|---|---|---|---|---|
| FIRST CONTROL INFORMATION (POSITIONING) | SMALL | SMALL | SMALL | OFF |
| SECOND CONTROL INFORMATION (CUTTING FEED) | LARGE | LARGE | LARGE | ON |

FIG.7

| | UPPER LIMIT SPEED OF CONTROL AXIS | POSITION GAIN | FEEDFORWARD COEFFICIENT | ACCELERATION/ DECELERATION TIME CONSTANT | ACCELERATION |
|---|---|---|---|---|---|
| FIRST CONTROL INFORMATION (POSITIONING) | LARGE | SMALL | SMALL | $\tau 1$ | — |
| SECOND CONTROL INFORMATION (CUTTING FEED) | SMALL | LARGE | LARGE | $\tau 2$ | $\alpha$ |

```
   .
   .
   .
N100 X100 F6000;
N200 X80 F2800;
N300 X50 F1500;
   .
   .
   .
```

NUMERICAL CONTROL DEVICE AND COMPUTER-READABLE STORAGE MEDIUM

CROSS REFERENCE TO RELATED APPLICATIONS

This is the U.S. National Phase application of PCT/JP2021/018083, filed May 12, 2021, the disclosure of this application being incorporated herein by reference in its entirety for all purposes.

FIELD OF THE INVENTION

The present disclosure relates to a numerical controller and a computer readable storage medium.

BACKGROUND OF THE INVENTION

Numerical controllers control respective parts of machine tools based on machining programs. In machining programs, control information for controlling control axes is set based on codes called G codes. For example, once a positioning instruction G00 is designated, a position gain, a feedforward coefficient, and an acceleration/deceleration time constant that correspond to the positioning instruction are set as the control information. Further, once a cutting feed instruction G01 is designated, a position gain, a feedforward coefficient, and an acceleration/deceleration time constant that correspond to the cutting feed instruction are set as the control information.

PATENT LITERATURE

Patent Literature 1: International Publication No. 2020/085437

SUMMARY OF THE INVENTION

However, authors of machining programs may wrongly write a different G code from an intended G code to the machining programs. In such a case, machining is performed in a state where different control information from the control information intended by the author of a machining program has been set. This may result in lower machining accuracy of a workpiece or result in a longer machining time.

The present disclosure intends to provide a numerical controller that can perform control on a control axis in a state where suitable control information has been set.

The numerical controller includes: a control information storage unit that stores multiple pieces of control information used for controlling a control axis of a machine tool; a control information determination unit that, based on a speed instruction designating a feed rate of the control axis or a motion instruction derived from the speed instruction, determines one control information out of the multiple pieces of control information stored in the control information storage unit; and a control unit that controls the control axis based on the one control information determined by the control information determination unit.

The computer readable storage medium stores an instruction that causes a computer to perform: based on a speed instruction designating a feed rate of the control axis of a machine tool or a motion instruction derived from the speed instruction, determining one control information out of multiple pieces of control information used for controlling the control axis of the machine tool; and controlling the control axis based on the determined one control information.

One aspect of the present disclosure makes it possible to perform control on a control axis in a state where suitable control information has been set.

BRIEF DESCRIPTION OF DRAWINGS

FIG. 3 is a diagram illustrating an example of control information stored in a control information storage unit.

FIG. 7 is a diagram illustrating an example of control information stored in the control information storage unit.

DETAILED DESCRIPTION OF EMBODIMENTS OF THE INVENTION

One embodiment of the present disclosure will be described below with reference to the drawings. Note that not all of the combined features described in the following embodiment are necessarily required for achieving the object. Further, detailed description than is needed may be omitted. Further, the description and the drawings of the following embodiment are provided for those skilled in the art to fully understand the present disclosure and are not intended to limit the claims.

Figure 1:
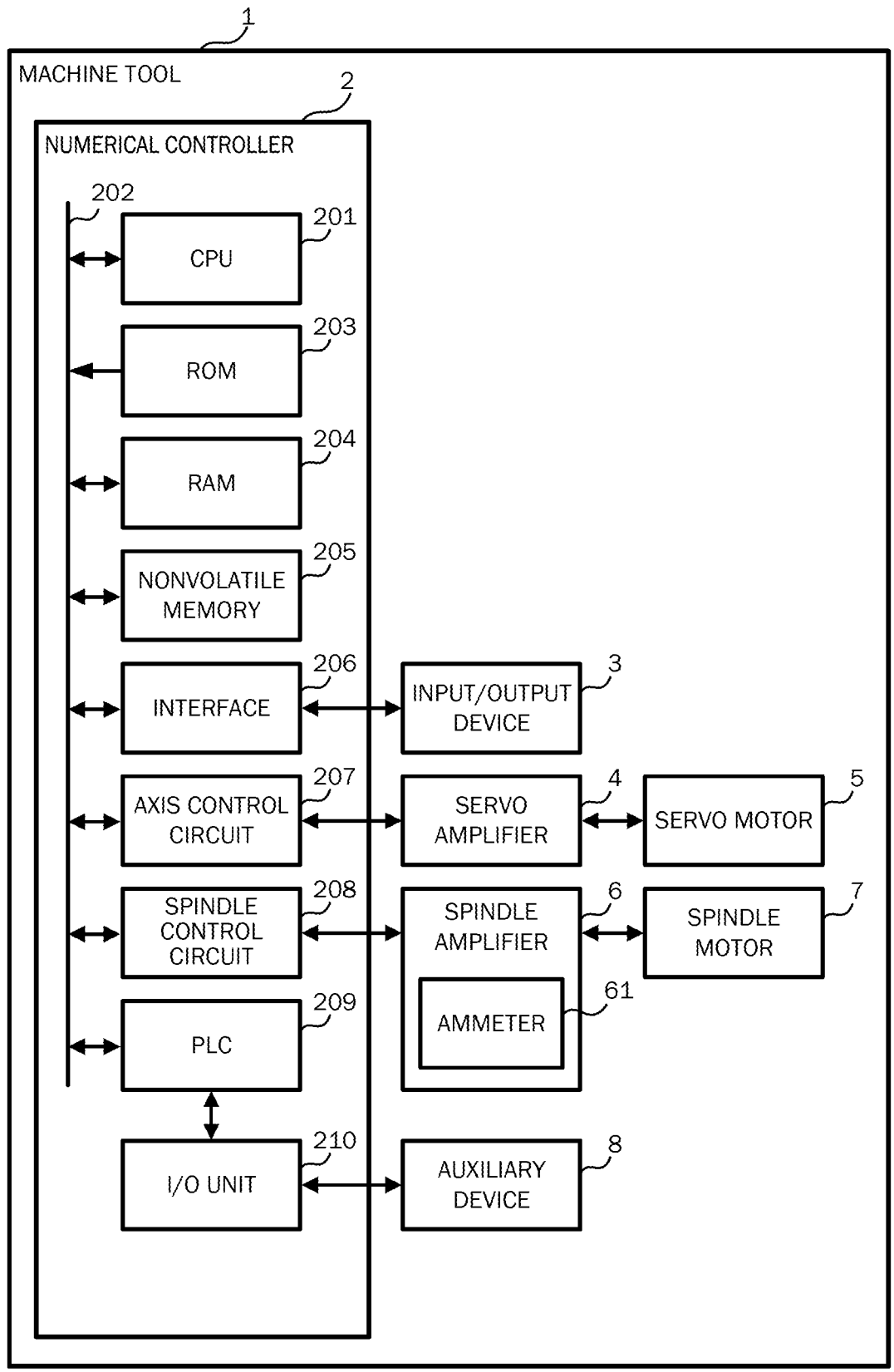
FIG. 1 is a diagram illustrating an example of a hardware configuration diagram of a machine tool.

FIG. 1 is a diagram illustrating an example of a hardware configuration of a machine tool. The machine tool 1 is, for example, a lathe, a machining center, or a multi-tasking machine.

The machine tool 1 has a numerical controller 2, an input/output device 3, a servo amplifier 4 and a servo motor 5, a spindle amplifier 6 and a spindle motor 7, and an auxiliary device 8, for example.

The numerical controller 2 is a device that controls the overall machine tool 1. The numerical controller 2 has a central processing unit (CPU) 201, a bus 202, a read-only memory (ROM) 203, a random-access memory (RAM) 204, and a nonvolatile memory 205.

The CPU 201 is a processor that controls the overall numerical controller 2 in accordance with a system program. The CPU 201 reads a system program or the like stored in the ROM 203 via the bus 202 and performs various processes based on the system program. Further, the CPU 201 controls the servo motor 5 and the spindle motor 7 based on a machining program.

The CPU 201 performs, for example, analysis of a machining program and output of a control instruction to the servo motor 5 and the spindle motor 7 on a control cycle basis.

The bus 202 is a communication path connecting respective hardware components within the numerical controller 2 to each other. Respective hardware components within the numerical controller 2 transfer data to each other via the bus 202.

The ROM 203 is a storage device that stores a system program or the like used for controlling the overall numerical controller 2. The ROM 203 is a computer readable storage medium.

The RAM 204 is a storage device that temporarily stores various data. The RAM 204 functions as a work area where the CPU 201 processes various data.

The nonvolatile memory 205 is a storage device that holds data even when the machine tool 1 is powered off and the numerical controller 2 is not supplied with power. For example, the nonvolatile memory 205 stores a machining program and stores various parameters input from the input/output device 3. The nonvolatile memory 205 is a computer readable storage medium. The nonvolatile memory 205 is formed of a solid state drive (SSD), for example.

The numerical controller 2 further includes an interface 206, an axis control circuit 207, a spindle control circuit 208, a programmable logic controller (PLC) 209, and an I/O unit 210.

The interface 206 connects the bus 202 and the input/output device 3 to each other. For example, the interface 206 transmits various data processed by the CPU 201 to the input/output device 3.

The input/output device 3 is a device that receives various data via the interface 206 and displays the various data. Further, the input/output device 3 accepts input of various data and transmits the various data to the CPU 201 via the interface 206. The input/output device 3 includes a display such as a liquid crystal display (LCD), a keyboard, a mouse, and the like. The input/output device 3 may instead be a touch panel.

The axis control circuit 207 is a circuit that controls the servo motor 5. The axis control circuit 207 outputs an instruction for driving the servo motor 5 to the servo amplifier 4 in response to a control instruction from the CPU 201. For example, the axis control circuit 207 transmits a torque command used for controlling the torque of the servo motor 5 to the servo amplifier 4.

The servo amplifier 4 supplies current to the servo motor 5 in response to an instruction from the axis control circuit 207.

The servo motor 5 is driven in response to being supplied with current from the servo amplifier 4. For example, the servo motor 5 is coupled to a ball screw that drives a tool post. When the servo motor 5 is driven, a structure of the machine tool 1, such as a tool post, moves in the X-axis direction, the Y-axis direction, or the Z-axis direction, for example. Note that a speed detector (not illustrated) that determines the feed rate of each control axis may be built in the servo motor 5.

The spindle control circuit 208 is a circuit for controlling the spindle motor 7. The spindle control circuit 208 outputs an instruction for driving the spindle motor 7 to the spindle amplifier 6 in response to a control instruction from the CPU 201. For example, the spindle control circuit 208 transmits a torque command used for controlling the torque of the spindle motor 7 to the spindle amplifier 6.

The spindle amplifier 6 supplies current to the spindle motor 7 in response to an instruction from the spindle control circuit 208. An ammeter 61 that measures a current value of current supplied to the spindle motor 7 is built in in the spindle amplifier 6.

The ammeter 61 determines a current value of current supplied to the spindle motor 7. The ammeter 61 transmits data indicating a determined current value to the CPU 201.

The spindle motor 7 is driven in response to current supply from the spindle amplifier 6. The spindle motor 7 is coupled to a spindle and rotates the spindle.

The PLC 209 is a device that executes a ladder program to control the auxiliary device 8. The PLC 209 transmits an instruction to the auxiliary device 8 via the I/O unit 210.

The I/O unit 210 is an interface that connects the PLC 209 and the auxiliary device 8 to each other. The I/O unit 210 transmits an instruction received from the PLC 209 to the auxiliary device 8.

The auxiliary device 8 is a device installed in the machine tool 1 and configured to perform auxiliary operations in the machine tool 1. The auxiliary device 8 may be a device installed around the machine tool 1. The auxiliary device 8 operates based on an instruction received from the I/O unit 210. The auxiliary device 8 is, for example, a tool changer, a cutting fluid injector, or an opening/closing door drive device.

Next, an example of the functions of the numerical controller 2 will be described. The numerical controller 2 is a device that controls each part of the machine tool 1 based on a machining program.

Figure 2:
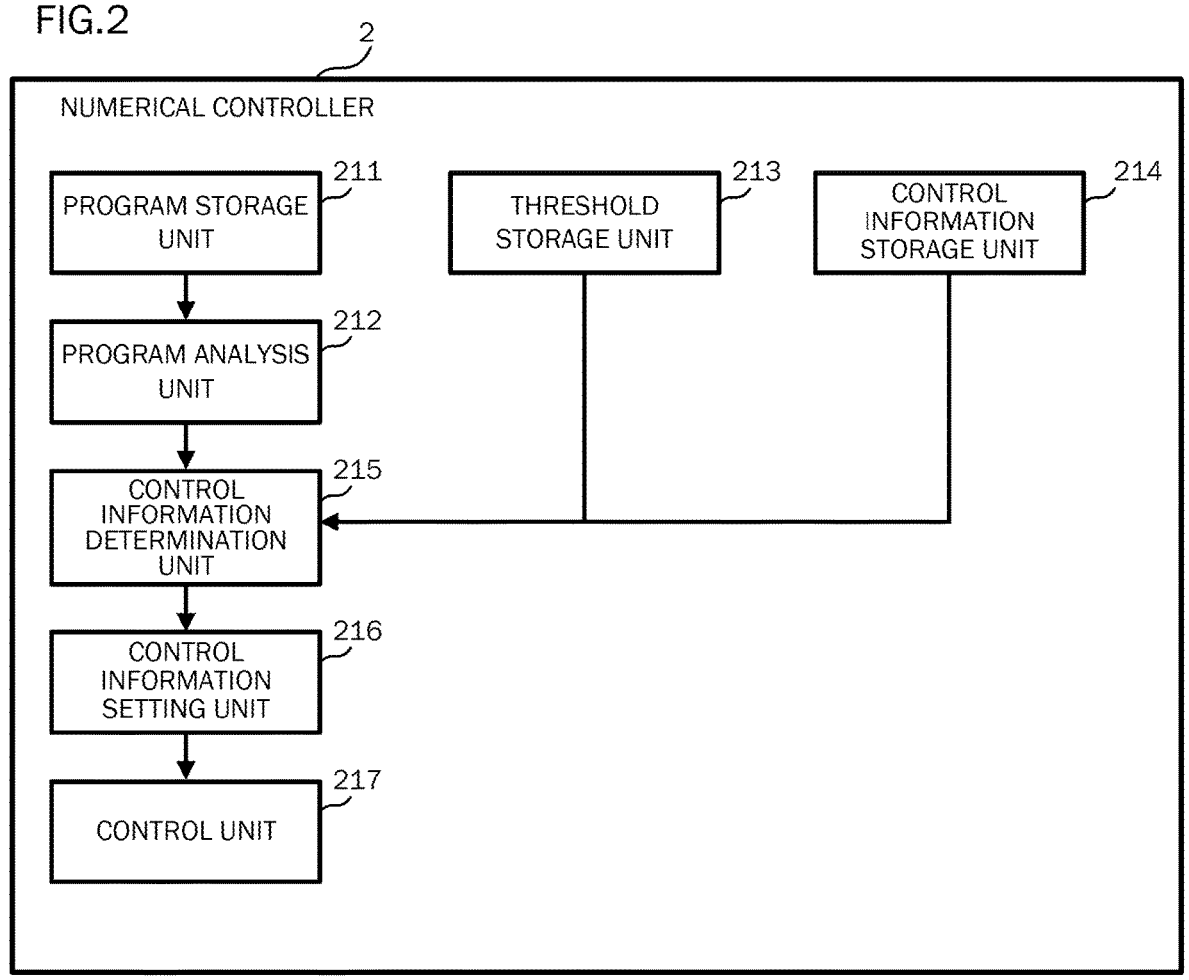
FIG. 2 is a block diagram illustrating an example of functions of a numerical controller.

FIG. 2 is a block diagram illustrating an example of the functions of the numerical controller 2. The numerical controller 2 includes a program storage unit 211, a program analysis unit 212, a threshold storage unit 213, a control information storage unit 214, a control information determination unit 215, a control information setting unit 216, and a control unit 217.

The program storage unit 211 is implemented when a machining program input from the input/output device 3 or the like is stored in the RAM 204 or the nonvolatile memory 205. The threshold storage unit 213 and the control information storage unit 214 are implemented when a parameter, control information, and the like input from the input/output device 3 or the like are stored in the RAM 204 or the nonvolatile memory 205.

The program analysis unit 212, the control information determination unit 215, the control information setting unit 216, and the control unit 217 are implemented when the CPU 201 performs calculation processing by using a system program stored in the ROM 203 and various data stored in the nonvolatile memory 205.

The program storage unit 211 stores a machining program. The machining program is a program for operating each part of the machine tool 1 to perform machining of a workpiece. In a machining program, a motion path of a tool, a rotation speed of the spindle, a depth of cut, and the like are designated using G codes, S codes, and the like. Further, in a machining program, a feed rate is designated using F codes. That is, the F code designating a feed rate in a machining program is a speed instruction.

The program analysis unit 212 reads a machining program stored in the program storage unit 211 and analyzes the machining program. By the program analysis unit 212 analyzing a machining program, the numerical controller 2 recognizes each instruction written in the machining program.

The threshold storage unit 213 stores one or a plurality of thresholds. The threshold stored in the threshold storage unit 213 is used for the control information determination unit 215 to determine one control information. The function of the control information determination unit 215 will be described as follows in detail.

The control information storage unit 214 stores multiple pieces of control information used for controlling control axes of the machine tool 1. The control information is information set for moving control axes of the machine tool 1. The control axes of the machine tool 1 are axes for moving or rotating a tool or the spindle. For example, the control axes include orthogonal three axes consisting of an X-axis, a Y-axis, and a Z-axis. Further, the control axes may include, for example, an A-axis, a B-axis, and a C-axis where an axis parallel to the X-axis direction, an axis parallel to the Y-axis direction, and an axis parallel to the Z-axis direction are rotary axes, respectively.

Note that the threshold storage unit 213 and the control information storage unit 214 may be provided to an external medium (for example, a universal serial bus (USB) memory). In such a case, based on information stored in the external medium, the control information determination unit 215 determines control information described later.

For example, the multiple pieces of control information include first control information and second control information. The multiple pieces of control information may include three or more pieces of control information. The first control information and the second control information include, for example, at least any of a position gain, a feedforward coefficient, an acceleration/deceleration time constant, and information indicating whether a function is on or off, respectively. Herein, the function is a function related to motion of control axes. The function related to motion of control axes is performed during machining of a workpiece, for example. In the present embodiment, an oscillation cutting function is presented as an example of the function. Further, the first control information and the second control information may include at least any of information indicating an upper limit speed of a control axis, information indicating an acceleration, information as to whether a high-accuracy cutting function is on or off, information as to whether output of a rapid traverse signal or a cutting feed signal is on or off, information indicating an in-position width, or information indicating a tool inward turning tolerance, respectively.

The position gain is a numerical value that is multiplied by a position deviation that is the difference between a position instruction designating a position of a control axis and a position feedback value indicating the position of the control axis controlled based on the position instruction. The position deviation is multiplied by the position gain, and thereby an instruction value for instruction of the speed of the control axis is calculated. The position gain is also referred to as a position loop gain.

The feedforward coefficient is a numerical value that is multiplied by a derivative value of a position instruction designating a position of a control axis. A value obtained by multiplying the derivative value of the position instruction by the feedforward coefficient is added to the speed instruction, thereby the speed instruction to the control axis is compensated, and the instruction follow-up performance is improved.

The acceleration/deceleration time constant is a numerical value indicating a time taken for a control axis to transit from a speed designated by a speed instruction to a stopped state or to reach a speed designated by a speed instruction from a stopped state.

The oscillation cutting is to cause a tool to perform an oscillating operation or a vibrating operation during machining of a workpiece. By performing oscillation cutting, it is possible to cut chips into small pieces. To prevent an adverse effect of vibration on a machine, the oscillation cutting function is set to off in general during no cutting being performed such as during a positioning instruction being executed. Further, the oscillation cutting function is often operated with an oscillation amplitude that is proportional to a feed rate of a control axis in order to cut chips into pieces. When the feed rate is particularly large, an operation with an oscillation amplitude that is proportional to the feed rate will increase the oscillation amplitude, and this will also result in excessively large vibration. Thus, when the feed rate is particularly large, it may be rather desirable to turn off the oscillation cutting function.

FIG. 3 is a diagram illustrating an example of control information stored in the control information storage unit 214. For example, the control information storage unit 214 stores the first control information and the second control information.

The position gain of the first control information is smaller than the position gain of the second control information. The feedforward coefficient of the first control information is smaller than the feedforward coefficient of the second control information. The acceleration/deceleration time constant of the first control information is smaller than the acceleration/deceleration time constant of the second control information. In the information indicating whether oscillation cutting is on or off in the first control information, information indicating "off" is set. Further, in the information indicating whether oscillation cutting is on or off in the second control information, information indicating "on" is set.

For example, the first control information corresponds to control information set when a positioning instruction is designated in the conventional numerical controller 2. For example, the second control information corresponds to control information set when a cutting feed instruction is designated in the conventional numerical controller 2.

The control information determination unit 215 determines one control information out of the multiple pieces of control information stored in the control information storage unit 214 based on a speed instruction designating a feed rate of a control axis. For example, the speed instruction designating a feed rate of a control axis is designated by an F code in a machining program.

Based on the feed rate of the control axis designated by the speed instruction and a threshold stored in the threshold storage unit 213, the control information determination unit 215 determines which control information to set out of the multiple pieces of control information stored in the control information storage unit 214.

First, the control information determination unit 215 compares the threshold stored in the threshold storage unit 213 with the feed rate of the control axis designated by the speed instruction. If the feed rate is greater than the threshold, the control information determination unit 215 determines that the control information is the first control information. On the other hand, if the feed rate is less than or equal to the threshold, the control information determination unit 215 determines that the control information is the second control information. Herein, a specific example in which the control information determination unit 215 determines one control information used for controlling a control axis will be described with reference to FIG. 4.

Figure 4:
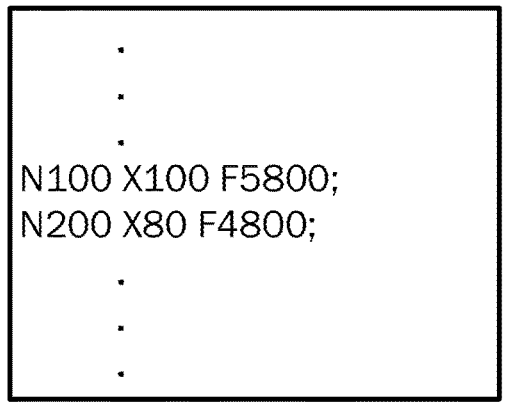
FIG. 4 is a diagram illustrating a part of a machining program.

FIG. 4 is a diagram illustrating a part of a machining program. Herein, X100 F5800 is designated on the line of sequence number N100 of the machining program. Further, X80 F4800 is designated on the line of sequence number N200. Further, the threshold storage unit 213 stores a threshold of 5000.

The control information determination unit 215 compares the value of 5800 indicated by the speed instruction designated on the line of sequence number N100 with the threshold of 5000. In this case, the feed rate indicated by the speed instruction designated on the line of sequence number N100 is greater than the threshold. Therefore, when the line of sequence number N100 is executed, the control information determination unit 215 determines that the control information is the first control information.

The control information determination unit 215 compares the value of 4800 indicated by the speed instruction designated on the line of sequence number N200 with the threshold of 5000. In this case, the feed rate indicated by the speed instruction designated on the line of sequence number N200 is less than or equal to the threshold. Therefore, when the line of sequence number N200 is executed, the control information determination unit 215 determines that the control information is the second control information.

The control information determination unit 215 may determine one control information out of the multiple pieces of control information stored in the control information storage unit 214 based on a motion instruction derived from a speed instruction designating a feed rate of a control axis. That is, when deriving a motion instruction from a speed instruction, the control information determination unit 215 compares a threshold stored in the threshold storage unit 213 with a feed rate designated by the speed instruction and derives a motion instruction based on the result of the comparison. For example, a positioning instruction and a cutting feed instruction are included in the motion instruction to be derived.

If the feed rate is greater than the threshold, the control information determination unit 215 determines that the motion instruction is the positioning instruction. That is, the control 1 information determination unit 215 derives the positioning instruction as the motion instruction from the speed instruction designated by the machining program. When the derived motion instruction is the positioning instruction, the control information determination unit 215 determines that the control information is the first control information corresponding to the positioning instruction.

In contrast, if the feed rate is less than or equal to the threshold, the control information determination unit 215 determines that the motion instruction is the cutting feed instruction. That is, the control information determination unit 215 derives the cutting feed instruction as the motion instruction from the speed instruction designated by the machining program. When the derived motion instruction is the cutting feed instruction, the control information determination unit 215 determines that the control information is the second control information corresponding to the cutting feed instruction.

Note that the motion instruction to be derived from a speed instruction may include a first cutting feed instruction and a second cutting feed instruction that is different from the first cutting feed instruction. The control information determination unit 215 may determine one control information corresponding to the first cutting feed instruction if the derived motion instruction is the first cutting feed instruction, and the control information determination unit 215 may determine another control information corresponding to the second cutting feed instruction if the derived motion instruction is the second cutting feed instruction.

Further, the motion instruction to be derived from a speed instruction may include a first positioning instruction and a second positioning instruction that is different from the first positioning instruction. The control information determination unit 215 may determine one control information corresponding to the first positioning instruction if the derived motion instruction is the first positioning instruction, and the control information determination unit 215 may determine another control information corresponding to the second positioning instruction if the derived motion instruction is the second positioning instruction.

The control information setting unit 216 sets the one control information determined by the control information determination unit 215 to the control information used in control of a control axis. If the first control information is determined as the control information, the control information setting unit 216 sets the position gain, the feedforward coefficient, the acceleration/deceleration time constant, and the information indicating whether oscillation cutting is on or off to a "small" value, a "small" value, a "small" value, and "off", for example, respectively. If the second control information is determined as the control information, the control information setting unit 216 sets the position gain, the feedforward coefficient, the acceleration/deceleration time constant, and the information indicating whether oscillation cutting is on or off to a "large" value, a "large" value, a "large" value, and "on", for example, respectively. Herein, the "small" value and the "large" value mean a relatively "smaller" value and a relatively "larger" value, respectively, when the first control information and the second control information are compared with each other.

The control unit 217 controls a control axis based on the one control information determined by the control information determination unit 215. If the first control information is determined by the control information determination unit 215, the control unit 217 controls the control axis based on the first control information. Further, if the second control information is determined by the control information determination unit 215, the control unit 217 controls the control axis based on the second control information.

Next, a flow of the process performed by the numerical controller 2 will be described.

Figure 5:
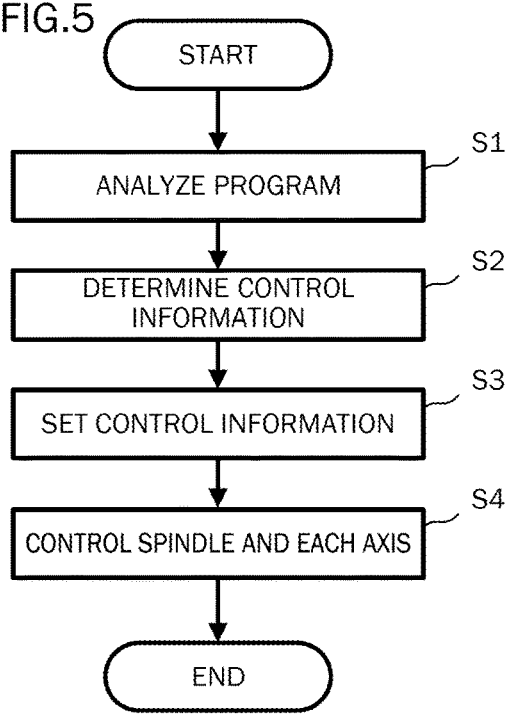
FIG. 5 is a flowchart illustrating an example of a flow of a process performed by the numerical controller.

FIG. 5 is a flowchart illustrating an example of a flow of the process performed by the numerical controller 2.

In the numerical controller 2, first, the program analysis unit 212 reads a machining program from the program storage unit 211 and analyzes the read machining program (step S1).

Next, the control information determination unit 215 determines one control information out of multiple pieces of control information stored in the control information storage unit 214 based on a speed instruction designating a feed rate of a control axis or a motion instruction derived from the speed instruction (step S2).

Next, the control information setting unit 216 sets the one control information determined by the control information determination unit 215 to the control information used for controlling the control axis (step S3).

Next, the control unit 217 controls a control axis based on the one control information set by the control information determination unit 215 (step S4) and ends the process. Note that the numerical controller 2 may perform the process of steps S1 to S4 every time each line of the machining program is executed or repeat the process of these steps at a predetermined period.

As described above, the numerical controller 2 includes the control information storage unit 214 that stores multiple pieces of control information used for controlling a control axis of the machine the control tool 1, information determination unit 215 that, based on a speed instruction designating a feed rate of the control axis or a motion instruction derived from the speed instruction, determines one control information out of the multiple pieces of control information stored in the control information storage unit 214, and a control unit 217 that controls the control axis based on the one control information determined by the control information determination unit 215.

Therefore, the numerical controller can perform control of a control axis based on suitable control information. That is, since it is no longer required to designate a positioning instruction G00 and a cutting feed instruction G01 in a machining program, it is possible to prevent machining from being performed in a state where different control information from the control information intended by the author of the machining program has been set. Further, it is possible to reduce the number of codes designated in a machining program.

In the embodiment described above, the motion instruction includes a positioning instruction and a cutting feed instruction, the control information determination unit 215 determines the one control information corresponding to the positioning instruction when the derived motion instruction is the positioning instruction, and the control information determination unit 215 determines the one control information corresponding to the cutting feed instruction when the derived motion instruction is the cutting feed instruction. Therefore, suitable control information is set when a positioning instruction is derived and when a cutting feed instruction is derived, respectively.

Further, the multiple pieces of control information include at least any of a position gain, a feedforward coefficient, an acceleration/deceleration time constant, and information indicating whether oscillation cutting is on or off, respectively. Therefore, each information included in control information can be set taking machining accuracy, a cycle time, and the like into consideration.

In the embodiment described above, the speed instruction is designated in a machining program. However, the speed instruction may be designated, for example, by any of a parameter, an external signal, and an external medium without being limited to be designated by a machining program. Herein, the parameter may be a parameter set for the numerical controller 2. The external signal may be, for example, a signal input from the PLC 209 or a personal computer (PC) connected to the numerical controller 2. The external medium may be, for example, a universal serial bus (USB) memory. Further, the control information determination unit 215 may determine control information based on any of a parameter, an external signal, and a value stored in the external medium instead of the threshold stored in the threshold storage unit 213.

In the embodiment described above, the example in which the control information determination unit 215 compares a speed instruction designated by a machining program with a threshold and determines one control information based on the result of the comparison has been described. However, the control information determination unit 215 may determine control information by comparing a threshold with a ratio between speed instructions before and after switching when the speed instruction is switched, that is, a speed ratio.

For example, when a speed instruction value on one line of a machining program and a speed instruction value on the subsequent next line differ from each other, the control information determination unit 215 compares the speed ratio with a threshold. If the speed ratio is greater than the threshold, the control information determination unit 215 determines the first control information illustrated in FIG. 3, for example, as control information to be set. If the speed ratio is less than or equal to the threshold, the control information determination unit 215 determines the second control information illustrated in FIG. 3 as control information to be set. Next, a specific example in which the control information determination unit 215 compares a speed ratio with a threshold to determine one control information used in control of a control axis will be described with reference to FIG. 6.

Figure 6:
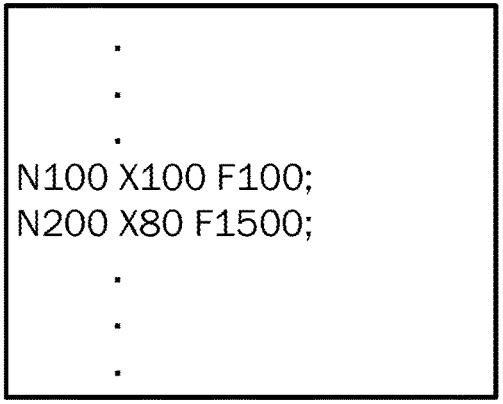
FIG. 6 is a diagram illustrating a part of a machining program.

FIG. 6 is a diagram illustrating a part of a machining program. X100 F100 is designated on the line of sequence number N100 of the machining program. Further, X80 F1500 is designated on the line of sequence number N200. Further, the threshold storage unit 213 stores a threshold of 1000.

The control information determination unit 215 compares the threshold, 1000 [%], with the ratio of the value of 1500 indicated by the speed instruction designated on the line of sequence number N200 to the value of 100 indicated by the speed instruction designated on the line of sequence number N100, that is, the speed ratio 1500/100×100=1500 [%]. In this case, the speed ratio is greater than the threshold. Therefore, the control information determination unit 215 determines that the control information used in the control of the control axis is the first control information at a timing of transition from the line of sequence number N100 to the line of sequence number N200.

In the embodiment described above, the information indicating whether the oscillation cutting function is on or off is included in the first control information and the second control information. Without being limited to the oscillation cutting function, however, any function may be employed as long as it is a function to be switched on or off by a speed instruction or a motion instruction derived from the speed instruction. For example, the function may be an interpolation function for performing high-quality machining. The interpolation function is a function of interpolating a motion path so as to smoothly connect motion instruction points to each other for a cutting motion instruction.

Enabling the interpolation function requires significant control costs. Thus, when the feed rate is high, the CPU will be heavily loaded. In such a case, the interpolation function may not work properly. In such a case, it is preferable to turn off this function. As such, any function may be employed as long as it is a function to be switched on or off based on a feed rate.

In the embodiment described above, the control information determination unit 215 determines one control information out of multiple pieces of control information stored in the control information storage unit 214 based on a speed instruction designating a feed rate of a control axis or a motion instruction derived from the speed instruction. However, the control information determination unit 215 may further change the determined control information based on an acceleration time of the control axis when the speed instruction is switched. An example in which the control information determination unit 215 changes determined control information based on an acceleration time of a control axis when the speed instruction is switched will be described with reference to FIG. 7 to FIG. 9.

Figure 8:
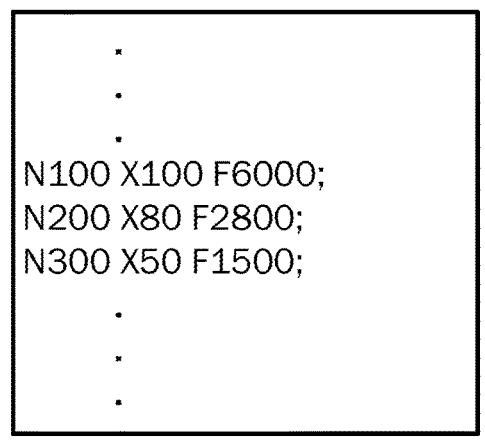
FIG. 8 is a diagram illustrating a part of a machining program.
Figure 9:
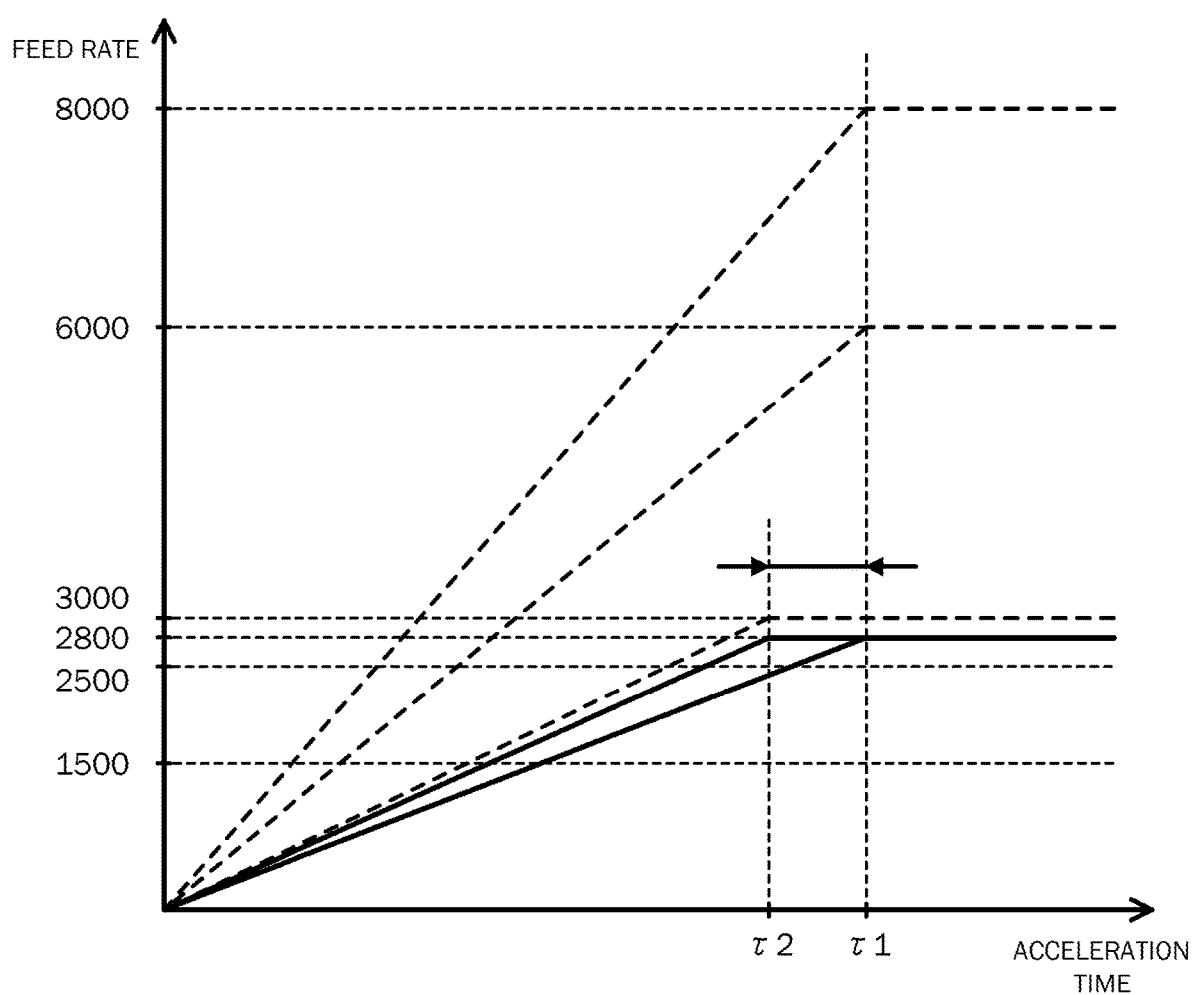
FIG. 9 is a diagram illustrating an example of an acceleration time of a control axis.

FIG. 7 is a diagram illustrating an example of control information stored in the control information storage unit 214. FIG. 8 is a diagram illustrating a part of a machining program. FIG. 9 is a diagram illustrating an acceleration time of a control axis.

The control information storage unit 214 stores the first control information and the second control information. The first control information includes a position gain, a feedforward coefficient, and an acceleration/deceleration time constant. The position gain in the first control information is set to a smaller value than the position gain in the second control information. Further, the feedforward coefficient in the first control information is set to a smaller value than the feedforward coefficient in the second control information.

The second control information includes a position gain, a feedforward coefficient, and an acceleration/deceleration time constant. The position gain in the second control information is set to a larger value than the position gain in the first control information. Further, the feedforward coefficient in the second control information is set to a larger value than the feedforward coefficient in the first control information.

In the conventional numerical controller, an upper limit speed of a control axis is set in advance in a parameter or the like taking into consideration of a machine configuration of a machine tool and safety of the operation of a control axis or the like. For example, in the positioning instruction G00, a speed can be designated up to the maximum positioning speed. In the cutting feed instruction G01, a speed can be designated up to the maximum cutting feed rate. Further, an acceleration/deceleration time constant and, in addition, an acceleration are also set in advance in a parameter or the like. For example, once the positioning instruction G00 is designated, the speed is accelerated or decelerated to a designated speed at an acceleration/deceleration time constant or an acceleration during the positioning operation. Further, once the cutting feed instruction G01 is designated, the speed is accelerated or decelerated to a designated speed at an acceleration/deceleration time constant or an acceleration during the cutting feed operation.

It is assumed that the designation of a speed of a control axis is available up to F8000 in the first control information and that the designation of a speed of a control axis is available up to F3000 in the second control information. Further, $\tau 1$ [s] is designated as the acceleration/deceleration time constant in the first control information, and $\tau 2$ [s] is designated as the acceleration/deceleration time constant in the second control information.

In the example illustrated in FIG. 8, X100 F6000 is designated on the line of sequence number N100 in the machining program. Further, X80 F2800 is designated on the line of sequence number N200. Further, X50 F1500 is designated on the line of sequence number N300. It is assumed that a threshold of 2500 is stored in the threshold storage unit 213.

The control information determination unit 215 compares the value of 6000 designated by the F code with the threshold of 2500 when the instruction designated on the line of sequence number N100 is executed. The feed rate designated by the F code is greater than the threshold on this line. Therefore, when the line of N100 is executed, the control information determination unit 215 determines the first control information as the control information. Further, the acceleration time when the line of N100 is executed will be $\tau 1$ [s] (see FIG. 9).

The control information determination unit 215 compares the value of 2800 designated by the F code with the threshold of 2500 when the instruction designated on the line of sequence number N200 is executed. The feed rate designated by the F code is greater than the threshold on this line. Therefore, when the line of N200 is executed, the control information determination unit 215 determines the first control information as the control information.

In this example, since the value of 2800 designated by the F code exceeds the threshold, the control information determination unit 215 has determined the first control information as the control information. However, since the value is included in the range having the upper limit speed of 3000 for a control axis in the second control information, there is no problem with selecting the second control information in terms of the machine configuration or the operation of the control axis. Therefore, the control information determination unit 215 compares an acceleration time of a control axis taken when the control axis is controlled based on the first control information with an acceleration time of the control axis taken when the control axis is controlled based on the second control information. When the first control information has been set, the acceleration time until the feed rate F2800 is reached is $\tau 1$. In contrast, even if it is assumed that the second control information has been set, the time until the feed rate of the control axis reaches F2800 is $\tau 2$ [s] that is shorter than $\tau 1$ [s].

Therefore, when the line of N200 is executed, the control information determination unit 215 changes the once-determined first control information to the second control information. Accordingly, the cycle time of machining can be shortened by $(\tau 1 - \tau 2)$ [s].

The control information determination unit 215 compares the value of 1500 designated by the F code with the threshold of 2500 when the instruction designated on the line of sequence number N300 is executed. The feed rate designated by the F code is less than or equal to the threshold on this line. Therefore, when the line of N300 is executed, the control information determination unit 215 determines the second control information as the control information.

Note that, in this specific example, when the line of N200 is executed, an acceleration time of a control axis taken when the control axis is controlled based on the first control information is compared with an acceleration time of the control axis taken when the control axis is controlled based on the second control information. However, this comparison may be performed when the line of N100 is executed and when the line of N300 is executed.

Further, in the present embodiment, the first control information and the second control information include an acceleration/deceleration time constant. However, as with the cutting feed instruction G01, for example, a motion path of the control axis may be uniquely defined without relying on a setting of the acceleration/deceleration time constant or an acceleration in linear interpolation. The control information for such a case may include an acceleration in the first control information or the second control information, and an acceleration a may be used in comparison of the acceleration time.

Further, in this specific example, while the first control information includes an acceleration/deceleration time constant and includes no acceleration, the second control information includes no acceleration/deceleration time constant and includes an acceleration. However, each control information may be set such that, while the first control information includes no acceleration/deceleration time constant and includes an acceleration, the second control information includes an acceleration/deceleration time constant and includes no acceleration.

Further, in this specific example, the control information determination unit 215 compares a threshold with a speed instruction designated by a machining program, determines control information based on the result of the comparison, and then changes the determined control information based on an acceleration time of a control axis. However, the control information determination unit 215 may compare a threshold with a ratio between speed instructions before and after switching when the speed instruction is switched, that is, a speed ratio to determine control information and then change the determined control information based on an acceleration time of the control axis.

In the embodiment described above, one control information out of multiple pieces of control information stored in the control information storage unit 214 is determined based on a speed instruction designating a feed rate of a control axis or a motion instruction derived from the speed instruction. However, the numerical controller 2 may have a mode in which the control information determination unit 215 determines the first control information as the control information when the positioning instruction G00 is designated and determines the second control information as the control information when the cutting feed instruction G01 is designated as with the conventional art. That is, the numerical controller 2 may have a plurality of control modes, and in the first mode, the control information determination unit 215 may determine one control information out of the multiple pieces of control information stored in the control information storage unit 214 based on a speed instruction designating a feed rate of the control axis or a motion instruction derived from the speed instruction. Further, in the second mode, the numerical controller 2 may determine one control instruction corresponding to a positioning instruction or one control instruction corresponding to a cutting feed instruction based on the positioning instruction G00 or the cutting feed instruction G01 designated by a machining program.

Note that the present disclosure is not limited to the embodiment described above and can be changed as appropriate within the scope not departing from the spirit thereof. In the present disclosure, modification of any component of the embodiment or omission of any component of the embodiment is possible.

LIST OF REFERENCE SYMBOLS

1 machine tool
2 numerical controller
201 CPU
202 bus
203 ROM
204 RAM
205 nonvolatile memory
206 interface
207 axis control circuit
208 spindle control circuit
209 PLC
210 I/O unit
211 program storage unit
212 program analysis unit
213 threshold storage unit
214 control information storage unit
215 control information determination unit
216 control information setting unit
217 control unit
3 input/output device
4 servo amplifier
5 servo motor
6 spindle amplifier
61 ammeter
7 spindle motor
8 auxiliary device

The invention claimed is:

1. A numerical controller comprising:
a control information storage unit that stores multiple pieces of control information used for controlling a control axis of a machine tool;
a control information determination unit that, based on a speed instruction described in the machining program, designating a feed rate of the control axis or a motion instruction derived from the speed instruction, determines one control information out of the multiple pieces of control information stored in the control information storage unit; and
a control unit that controls the control axis based on the one control information determined by the control information determination unit.

2. The numerical controller according to claim 1,
wherein the derived motion instruction includes a positioning instruction and a cutting feed instruction,
wherein when the derived motion instruction is the positioning instruction, the control information determination unit determines the one control information corresponding to the positioning instruction, and
wherein when the derived motion instruction is the cutting feed instruction, the control information determination unit determines the one control information corresponding to the cutting feed instruction.

3. The numerical controller according to claim 1,
wherein the derived motion instruction described in the machining program includes a first cutting feed instruction and a second cutting feed instruction that is different from the first cutting feed instruction,
wherein when the derived motion instruction is the first cutting feed instruction, the control information determination unit determines the one control information corresponding to the first cutting feed instruction, and
wherein when the derived motion instruction is the second cutting feed instruction, the control information determination unit determines the one control information corresponding to the second cutting feed instruction.

4. The numerical controller according to claim 1,
wherein the derived motion instruction includes a first positioning instruction and a second positioning instruction that is different from the first positioning instruction,
wherein when the derived motion instruction is the first positioning instruction, the control information determination unit determines the one control information corresponding to the first positioning instruction, and
wherein when the derived motion instruction is the second positioning instruction, the control information determination unit determines the one control information corresponding to the second positioning instruction.

5. The numerical controller according to claim 1, wherein the multiple pieces of control information include at least any of a position gain, a feedforward coefficient, an acceleration/deceleration time constant, and information indicating whether a function is on or off, respectively.

6. The numerical controller according to claim 1, wherein the speed instruction is designated by any of a machining program, a parameter, an external signal, and an external medium.

7. The numerical controller according to claim 1, wherein the control information determination unit changes the determined one control information to another control information based on an acceleration time of the control axis derived from the speed instruction.

8. A computer readable non-transitory storage medium storing an instruction that causes a computer to perform:
- based on a speed instruction described in the machining program, designating a feed rate a control axis of a machine tool or a motion instruction derived from the speed instruction,
- determining one control information out of multiple pieces of control information used for controlling the control axis of the machine tool; and
- controlling the control axis based on the determined one control information.

* * * * *